United States Patent
Monta et al.

(10) Patent No.: US 7,801,213 B2
(45) Date of Patent: Sep. 21, 2010

(54) METHOD AND APPARATUS FOR MODIFYING A DATA RATE OF A VIDEO SIGNAL

(75) Inventors: Peter Monta, Palo Alto, CA (US); Edward A. Krause, San Mateo, CA (US)

(73) Assignee: RGB Networks, Inc., Sunnyvale, CA (US)

(*) Notice: Subject to any disclaimer, the term of this patent is extended or adjusted under 35 U.S.C. 154(b) by 0 days.

(21) Appl. No.: 11/881,209

(22) Filed: Jul. 25, 2007

(65) Prior Publication Data

US 2008/0072267 A1 Mar. 20, 2008

Related U.S. Application Data

(60) Provisional application No. 60/845,707, filed on Sep. 18, 2006.

(51) Int. Cl.
*H04N 7/12* (2006.01)
*H04N 11/02* (2006.01)
*H04N 11/04* (2006.01)

(52) U.S. Cl. .................................. 375/240.01
(58) Field of Classification Search ............. 375/240.01
See application file for complete search history.

(56) References Cited

U.S. PATENT DOCUMENTS

| | | | |
|---|---|---|---|
| 5,870,087 A | | 2/1999 | Chau |
| 5,969,768 A | | 10/1999 | Boyce et al. |
| 6,061,099 A | | 5/2000 | Hostetler |
| 6,097,442 A | | 8/2000 | Rumreich et al. |
| 6,175,388 B1 | | 1/2001 | Knox et al. |
| 6,226,328 B1 | | 5/2001 | Assuncao |
| 6,275,536 B1 | * | 8/2001 | Chen et al. ........... 375/240.25 |
| 6,295,094 B1 | | 9/2001 | Cuccia |
| 6,310,657 B1 | | 10/2001 | Chauvel et al. |
| 6,434,197 B1 | * | 8/2002 | Wang et al. ........... 375/240.29 |
| 6,727,886 B1 | | 4/2004 | Mielekamp et al. |
| 6,850,252 B1 | | 2/2005 | Hoffberg |
| 7,046,677 B2 | | 5/2006 | Monta et al. |
| 7,324,161 B2 | | 1/2008 | Hwang |
| 7,391,809 B2 | * | 6/2008 | Li et al. ............... 375/240.12 |
| 2002/0061184 A1 | | 5/2002 | Miyamoto |

(Continued)

OTHER PUBLICATIONS

Leon, Orlando, 'An Extensible Communication-Oriented Routing Environment for Pervasive Computing', Massachusetts Institute of Technology, Department of Electrical Engineering and Computer Science, Masters Thesis, May 24, 2002. [retrieved on Feb. 15, 2003]. Retrieved from the Internet: <URL: http://org.csail.mit.edu/pubs/theses/leon/leon-thesis.pdf>.

*Primary Examiner*—Mehrdad Dastouri
*Assistant Examiner*—Jeremaiah C Huber
(74) *Attorney, Agent, or Firm*—Lipsitz & McAllister, LLC (57) ABSTRACT

Methods, apparatus, and systems for modifying the data rate of a video signal are provided. A compressed video signal is received. A closed-loop transrating path for modifying a data rate of the video signal and an open-loop transrating path for modifying the data rate of the video signal are provided. One of the open-loop transrating path or the closed-loop transrating path is selected for modifying the data rate of at least a portion of the video signal. Pixel quantization error control may be provided in the closed loop transrating path.

16 Claims, 3 Drawing Sheets

U.S. PATENT DOCUMENTS

| | | | |
|---|---|---|---|
| 2002/0110193 A1* | 8/2002 | Yoo et al. ............... | 375/240.02 |
| 2002/0176495 A1 | 11/2002 | Vetro et al. | |
| 2002/0176508 A1 | 11/2002 | Boyce et al. | |
| 2003/0220835 A1 | 11/2003 | Barnes, Jr. | |
| 2004/0179597 A1* | 9/2004 | Rault .................... | 375/240.08 |
| 2004/0252982 A1 | 12/2004 | Iwahara et al. | |
| 2004/0268401 A1 | 12/2004 | Gray et al. | |
| 2007/0250896 A1 | 10/2007 | Parker et al. | |
| 2007/0297507 A1 | 12/2007 | Kim | |
| 2008/0056354 A1 | 3/2008 | Sun et al. | |

* cited by examiner

METHOD AND APPARATUS FOR MODIFYING A DATA RATE OF A VIDEO SIGNAL

This application claims the benefit of U.S. Provisional Application No. 60/845,707, filed Sep. 18, 2006, which is incorporated herein and made a part hereof by reference.

BACKGROUND OF THE INVENTION

The present invention relates to the field of video processing. More specifically, the present invention relates to methods, apparatus, and systems for modifying the data rate of a video stream.

In cable systems, multiple compressed video programs are combined to form multiplexes. Each multiplex is transmitted over a fixed-bandwidth channel to a network of receivers. Typically, a receiver decodes and displays one or more video programs by first tuning to a radio frequency corresponding to a selected multiplex, and then extracting the packets corresponding to the one or more selected programs.

It is desirable to maximize the number of digitally compressed programs which can be transmitted over the available fixed-bandwidth channels. One way to increase the number of video programs is to improve the efficiency of the video compression process. Utilizing the most advanced video compression algorithms is desirable, but it is difficult to upgrade an installed base of video receivers. One way to improve the efficiency of a video compression system while maintaining compatibility with an installed base of network receivers, is to utilize variable bit-rate (VBR) encoding. With VBR, the compression ratio is increased when a particular scene is easily compressed, and similarly the compression ratio is reduced when a particular scene is complex and more difficult to compress. By allowing the instantaneous bit rate to vary in this way, VBR encoders are able to deliver more uniform video quality while encoding at a lower average bit rate.

Although VBR encoders are more efficient than constant bit-rate (CBR) encoders, it is more difficult to combine compressed VBR programs into multiplexes. If the multiplex is to be transmitted over a fixed-bandwidth channel, then the instantaneous data rate of the multiplex cannot exceed the data-rate capacity of the channel. In fact, if the goal is to maximize image quality at all times, then the aggregate multiplex data rate should remain constant at a rate matching the full capacity of the channel. Statistical multiplexers are designed to achieve this result by broadcasting a "quality" setting to each VBR encoder. Assuming equal priorities among video encoders, the same quality setting would be conveyed to each, and the quality setting would be adjusted from time to time in order to maintain the desired aggregate data rate.

In many cases, video multiplexers are not co-located with the video encoders, or the programs to be multiplexed are pre-encoded, and therefore the encoding process cannot be regulated in order to achieve a desired aggregate data rate. If the compressed programs were generated using VBR encoders, then it can be difficult to insure that the aggregate data rate of each multiplex remains within the capacity of each corresponding communication channel. This problem is often addressed by utilizing sophisticated multiplexers with transrating capabilities. By coupling a transrater to some or all programs comprising a particular multiplex, it becomes possible to selectively reduce the date rate of the video programs. Such systems are often referred to as statistical remultipexers. In simple terms, a statistical remultiplexer reduces the bit rate of elementary video streams to be able to pack more elementary streams in a given transport stream. The MPEG standards allow requantization of existing video streams to achieve bit rate reduction. The level of quantization does not need to be fixed or constant. It is also unlikely that all the different streams peak, in terms of bitrate, at the same time. Statistics based algorithms could be deployed to calculate a level of quantization for each stream such that the transport stream bandwidth is utilized to its fullest while maintaining highest possible quality. There are many different ways to calculate such a level of quantization. An efficient statistical remultiplexer is able to maximize the quality of each program in the multiplex, while insuring that the aggregate data rate remains within the capacity of the channel at all times.

Figure 1:
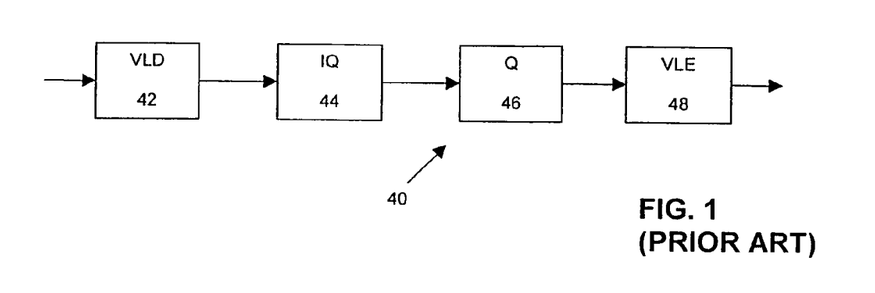
FIG. 1 shows a block diagram of a prior art open-loop transrater.

FIG. 1 shows an example of a simple prior art video transrater 40 that may be used with such statistical multiplexers. The transrater 40 is compatible with compression standards such as MPEG-1, MPEG-2 or H.264. The variable length decoder (VLD) module 42 receives a series of variable length codewords and reconstructs the quantized transform coefficients which these codewords represent. The inverse quantizer (IQ) module 44 performs an inverse quantization step in order to restore the proper scale and range to each transform coefficient. The quantizer (Q) module 46 rescales the transform coefficients once again, but this time the amount of quantization is controlled in order to maintain the desired output data rate. Finally, the variable length encoder (VLE) module 48 further compresses the quantized transform coefficients by representing them as a series of variable-length codewords.

With the prior art transrater 40 of FIG. 1, the accuracy of the recompressed video signal begins to diverge due to the predictive coding components of the compression process. That is, as inaccuracies are introduced by the quantizer module 46, the resulting artifacts can become magnified when information derived from the resulting quantized coefficients is used to predict new information in a subsequent video frame. This shortcoming of the prior art transrater 40 is addressed by the modified prior art transrating system 50 shown in FIG. 2.

Figure 2:
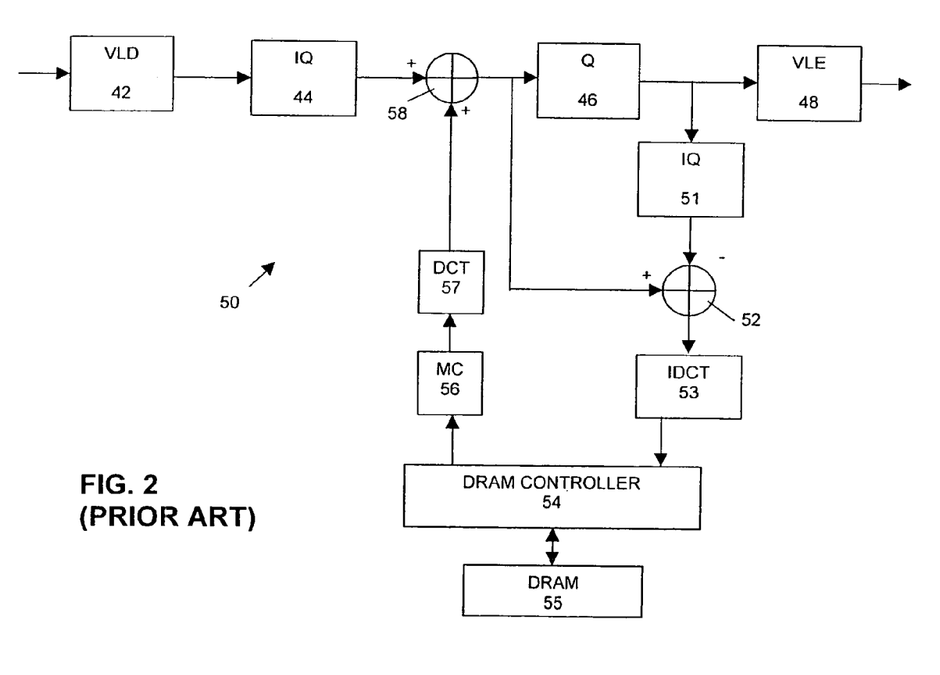
FIG. 2 shows a block diagram of a prior art closed-loop transrater with error control.

In the prior art transrating system 50 shown in FIG. 2, the VLD module 42, the IQ module 44, the Q module 46, and the VLE module 48 function as discussed above in connection with FIG. 1. However, in the system 50 shown in FIG. 2, the quantization errors introduced by the transrating process (in particular by the quantization module 46) are provided at the output of adder 52 as a result of subtracting the transform coefficients obtained from IQ module 51 from the transform coefficients obtained from adder 58. Blocks of transform coefficients from adder 52 are then converted back to the pixel domain by inverse discrete cosine transform (IDCT) module 53 and the resulting pixel errors are then stored in DRAM 55, which is controlled by DRAM controller 54. Pixel errors are retrieved by the motion compensator (MC) module 56 when needed for the prediction of other pixels in nearby image frames and are again converted to the coefficient domain by a discrete cosine transform (DCT) module 57. This result is added to the stream of incoming transform coefficients at adder 58, which prevents the accumulation of the requantization artifacts at Q module 46.

The prior art transrating system shown in FIG. 2 is representative of many predictive, transform based coders such as MPEG-1, MPEG-2, and H.264. Other compression systems may conform to the same structure, but may include additional steps, or alternative versions of the same modules.

The disadvantages of the prior art motion compensated transrating system shown in FIG. 2 are the increased complexity and cost of the additional hardware, and the compression inefficiencies resulting from the introduction of error compensation data at the output of the motion compensated tracking loop. Complexity is also introduced since DCTs, IDCTs, and motion compensators are generally implemented by processing all coefficients or pixels of every block. In contrast, it is only necessary to process the non-zero coefficients, and scan order conversions may be ignored, when implementing the open-loop transrater in FIG. 1. This simplifies implementations by permitting the use of narrower data buses while maintaining higher throughputs.

It would be advantageous to provide a transrating system which provides the benefit the drift correction provided by a closed-loop transrater while minimizing the disadvantages thereof. It would also be advantageous to provide a hybrid transrating system which provides the benefits of both a closed-loop transrater and an open-loop transrater.

The methods and apparatus of the present invention provide the foregoing and other advantages.

SUMMARY OF THE INVENTION

The present invention relates to the field of video processing. More particularly, the present invention provides methods, apparatus, and systems for modifying the data rate of a video signal.

In one example embodiment of the present invention, a compressed video signal is received. A closed-loop transrating path for modifying a data rate of the video signal and an open-loop transrating path for modifying the data rate of the video signal are provided. One of the open-loop transrating path or the closed-loop transrating path is selected for modifying the data rate of at least a portion of the video signal.

In a further example embodiment, pixel quantization error control may be provided in the closed loop transrating path. The pixel quantization error control may comprise: obtaining errors from quantization of transform coefficients of incoming pixels of the video signal in the form of error transform coefficients; performing an inverse transformation process on the error transform coefficients to provide pixel errors in the pixel domain; storing the pixel errors; retrieving the stored pixel errors during modification of the data rate of associated pixels; performing a transformation process on the pixel errors to provide error correction transform coefficients; and adding the error correction transform coefficients to scaled transform coefficients obtained from inverse quantization of the associated pixels in order to prevent accumulation of requantization artifacts during the quantization of the scaled transform coefficients.

The closed-loop transrating path may be selected for modifying the data rate of I-frames and P-frames of the video signal. The open-loop transrating path may be selected for modifying the data rate of B-frames of the video signal. In general, it is advantageous to use the closed-loop transrating path for modifying the data rate of the reference frames. These are the pictures which may be used to predict other pictures. In the case of MPEG-1 and MPEG-2, the reference frames are the I-frames and P-frames.

The closed-loop transrating path and the open loop transrating path may be operable simultaneously and may be adapted to accept and process frames of multiple video signals. For example, the closed-loop transrating path may be selected for modifying the data rate of I-frames and P-frames of the various video signals and at the same time the open-loop transrating path may be selected for modifying the data rate of B-frames of the various video signals.

In some instances, both of the open-loop transrating path and the closed loop transrating path may be available for processing I-frames and P-frames of the video signals. Similarly, both of the open-loop transrating path and the closed loop transrating path may be available for processing B-frames of the video signals.

The open-loop transrating path may comprise; variable length decoding of the video signal to provide quantized transform coefficients; performing an inverse quantization operation on the transform coefficients to scale the transform coefficients; performing a quantization operation on the scaled transform coefficients to re-scale the transform coefficients to achieve a desired data rate; and variable length encoding of the re-scaled transform coefficients to provide a video signal at the desired data rate.

The closed-loop transrating path may comprise: variable length decoding of the video signal to provide quantized transform coefficients; performing an inverse quantization operation on the transform coefficients to scale the transform coefficients; performing a quantization operation on the scaled transform coefficients to re-scale the transform coefficients to achieve a desired data rate; variable length encoding of the re-scaled transform coefficients to provide a video signal at the desired data rate; obtaining errors from the quantization operation in the form of error transform coefficients; performing an inverse transformation process on the error transform coefficients to provide pixel errors in the pixel domain; storing the pixel errors; retrieving the stored pixel errors when performing a motion compensation operation on associated pixels; performing a transformation process on the motion compensated pixel errors to provide error correction transform coefficients; and adding the error correction transform coefficients to the scaled transform coefficients obtained from the inverse quantization of the associated pixels in order to prevent accumulation of requantization artifacts during the quantization operation on the scaled transform coefficients.

An additional open-loop transrating path may be provided for modifying the data rate of the video signal. The two open-loop transrating paths and the closed-loop transrating path may be operable simultaneously. For example, the same system can be used to process multiple video streams, and in this case, it is possible to keep each of the open and closed loop processors busy by allocating a frame from any of the video streams for which a next frame is available.

Those skilled in the art will appreciate that additional open- or closed-loop transrating paths may be provided, as desired, in order to increase the processing speed of the system. For example, a plurality of open-loop and closed loop transrating paths may be provided for modifying the data rate of one or more video signals. The plurality of open-loop and closed-loop transrating paths may be operable simultaneously.

Methods, apparatus and systems corresponding to the above-described embodiments are encompassed by the present invention.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 3:
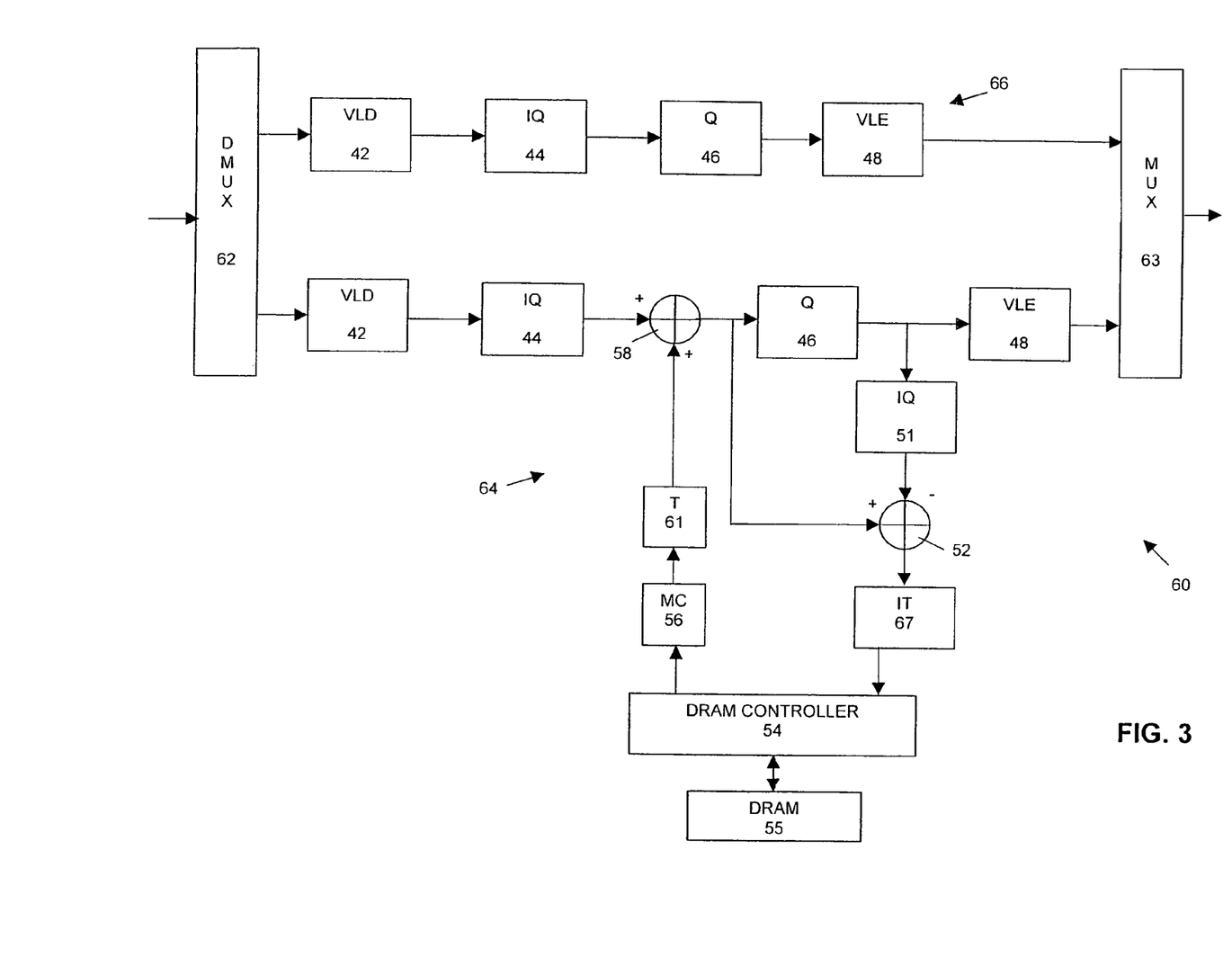
FIG. 3 shows a block diagram of an example embodiment of a hybrid transrating system in accordance with the present invention.

FIG. 3 shows a block diagram of an example embodiment of a hybrid system 60 for modifying the data rate of a video signal in accordance with the present invention. In the example embodiment shown in FIG. 3, a compressed video signal is received at demultiplexer (DMUX) 62. A closed-loop transrating path 64 for modifying a data rate of the video signal and an open-loop transrating path 66 for modifying the data rate of the video signal are provided. One of the open-loop transrating path or the closed-loop transrating path is selected for modifying the data rate of at least a portion of a video signal. For example, frames or packets of a video signal may be received at DMUX 62 and routed to the appropriate transrating path 64 or 66 according to information provided in the packet header. The task of assigning frames or packets corresponding to a plurality of video signals may be provided by a CPU normally associated with a video processor as is known in the art, so a software adjustment is all that is needed to establish or change the routing of frames or packets. The transrated packets can then be multiplexed together at multiplexer (MUX) 63.

Pixel quantization error control may be provided in the closed loop transrating path 64. The pixel quantization error control may comprise: obtaining errors from quantization of transform coefficients of incoming pixels of the video signal in the form of error transform coefficients. For example, the quantization errors introduced by the transrating process (in particular by the quantization (Q) module 46) are provided at the output of adder 52 as a result of subtracting the transform coefficients obtained from IQ module 51 from the transform coefficients obtained from adder 58. Blocks of transform coefficients from adder 52 are then converted back to the pixel domain by performing an inverse transformation process on the error transform coefficients at inverse transform (IT) module 67. These pixel errors may be stored in DRAM 55 (under the control of DRAM controller 54) and then retrieved during modification of the data rate of associated pixels. A transformation process may be performed on the pixel errors at transformation (T) module 61 to provide error correction transform coefficients. The error correction transform coefficients may be added at adder 58 to scaled transform coefficients obtained from inverse quantization of the associated pixels at IQ module 44 in order to prevent accumulation of requantization artifacts during the quantization of the scaled transform coefficients at the Q module 46.

It should be appreciated that the transformation process performed at T module 61 may be a discrete cosine transformation process (DCT) or any other transformation process that may be used with newer codecs, such as H.264. Similarly, the inverse transformation process performed at IT module 67 may be an inverse discrete cosine transformation process (IDCT) or any other transformation process that may be used with newer codecs, such as H.264.

The closed-loop transrating path 64 may be selected for modifying the data rate of I-frames and P-frames of a video signal. The open-loop transrating path 66 may be selected for modifying the data rate of B-frames of the video signal.

The closed-loop transrating path 64 and the open loop transrating path 66 may be operable simultaneously. For example, the closed-loop transrating path 64 may be selected for modifying the data rate of I-frames and P-frames of a particular video signal and at the same time the open-loop transrating path 66 may be selected for modifying the data rate of B-frames corresponding to a different video signal.

In some instances, both the open-loop transrating path 66 and the closed loop transrating path 64 may be available for processing I-frames and P-frames of a video signals in the event that the closed-loop transrating path 64 becomes oversubscribed and there is available processing bandwidth for I- and P-frames in the open-loop transrating path 66. Similarly, both of the open-loop transrating path 66 and the closed loop transrating path 64 may be available for processing B-frames of a video signals in the event that the open-loop transrating path 66 becomes oversubscribed and there is available processing bandwidth for B-frames in the closed-loop transrating path 64. One or more additional open-loop transrating path may be provided for modifying the data rate of the video signals, as discussed below in connection with FIG. 4. The two open-loop transrating paths and the closed-loop transrating path may be operable simultaneously. Those skilled in the art will appreciate that additional open- or closed-loop transrating paths may be provided, as desired, for increasing the throughput of the system.

The open-loop transrating path 66 may comprise: variable length decoding of the video signal at VLD module 42 to provide quantized transform coefficients; performing an inverse quantization operation on the transform coefficients at IQ module 44 to scale the transform coefficients; performing a quantization operation on the scaled transform coefficients at Q module 46 to re-scale the transform coefficients to achieve a desired data rate; and variable length encoding of the re-scaled transform coefficients at VLE module 48 to provide a video signal at the desired data rate.

The closed-loop transrating path may comprise: variable length decoding of a video signal at VLD module 42 to provide quantized transform coefficients; performing an inverse quantization operation on the transform coefficients at IQ module 44 to scale the transform coefficients; performing a quantization operation on the scaled transform coefficients at Q module 46 to re-scale the transform coefficients to achieve a desired data rate; variable length encoding of the re-scaled transform coefficients at VLE module 48 to provide a video signal at the desired data rate; obtaining errors from the quantization operation at Q module 46 in the form of error transform coefficients (provided as output from adder 52 as discussed above); performing an inverse transformation process on the error transform coefficients at IT module 67 to provide pixel errors in the pixel domain; storing the pixel errors in DRAM 55; retrieving the stored pixel errors when performing a motion compensation operation on associated pixels at MC module 56; performing a transformation process on the motion compensated pixel errors at T module 61 to provide error correction transform coefficients; and adding at adder 58 the error correction transform coefficients to the scaled transform coefficients obtained from the inverse quantization of the associated pixels (at IQ module 44) in order to prevent accumulation of requantization artifacts during the quantization operation on the scaled transform coefficients at Q module 46.

Figure 4:
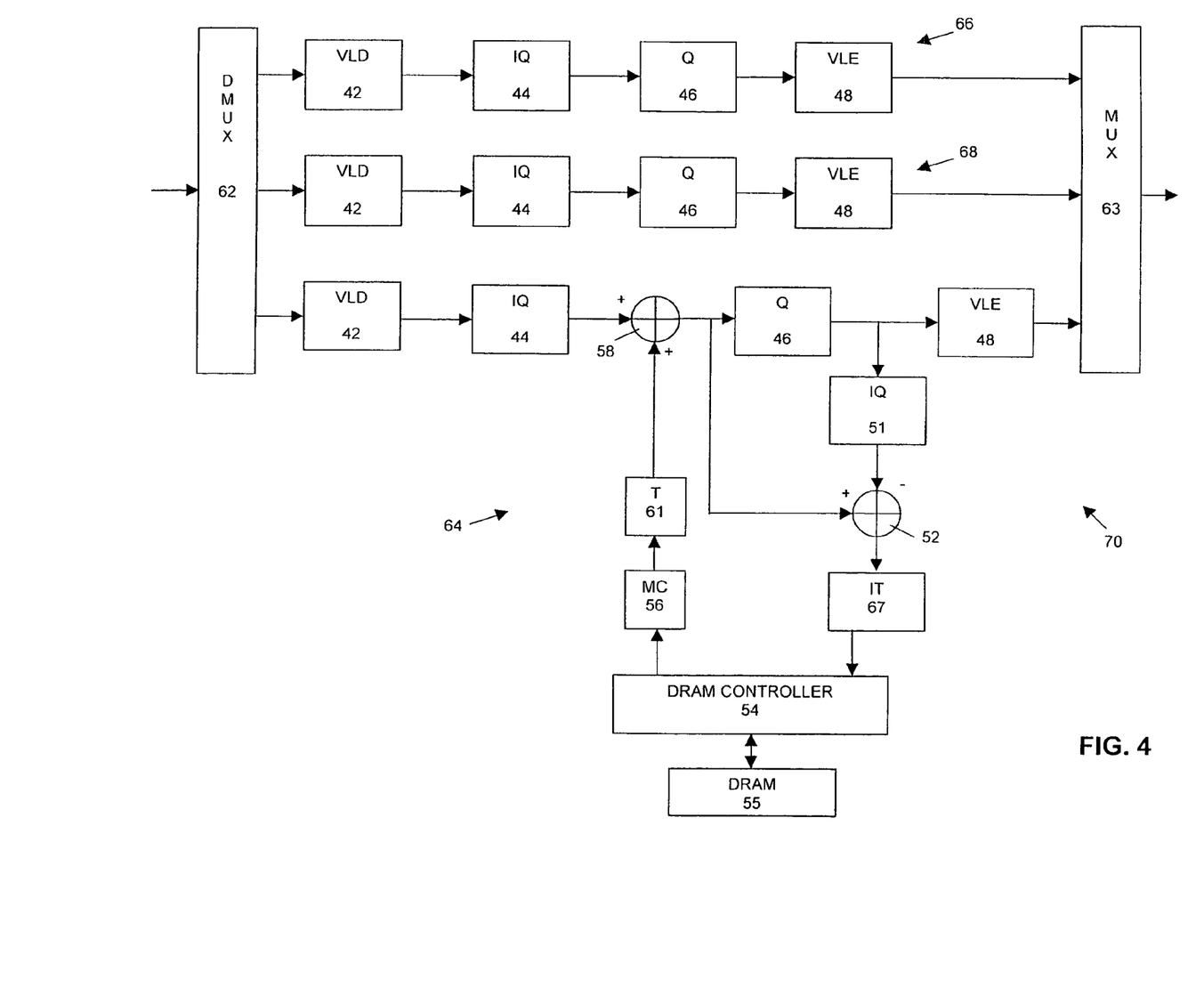
FIG. 4 shows a block diagram of a further example embodiment of a hybrid transrating system in accordance with the present invention.

FIG. 4 is a block diagram of a further example embodiment of the present invention, in which the system 60 of FIG. 3 is modified to have an additional open-loop transrating path 68 for modifying the data rate of the video signal. In the system 70 of FIG. 4, the additional open-loop transrating path provides the same functionality as the open-loop transrating path 66 discussed above. The two open-loop transrating paths 66 and 68 and the closed-loop transrating path 64 may be operable simultaneously. Those skilled in the art will appreciate that additional open- or closed-loop transrating paths may be provided, as desired, in order to increase the processing speed of the system. For example, a plurality of open-loop and closed loop transrating paths may be provided for modifying the data rate of multiple video signals. The plurality of open-loop and closed-loop transrating paths may be operable simultaneously.

The full cost and performance advantages of the hybrid transrating systems 60 and 70 shown in FIGS. 3 and 4, respectively, are only achieved by strategically assigning the video frames to the different transrating subsystems (paths). With compression systems such as MPEG-2 and H.264, certain types of frames (i.e., an Intra-coded frame or I-frame and a Predictive coded frame or P-frame) are used to predict other frames while a third type of frame (i.e. a Bi-directionally predicted or B-frames) typically are not (although H.264 permits the use of B-frames as reference frames for prediction). The frame types also differ in the way that they are encoded. I-frames do not benefit from motion compensation and therefore are the least efficient to compress. However, for the same reason, these are the only types of frames that can be reconstructed by a decoder which is attempting to synchronize with a new stream. This initial synchronization is necessary when tuning to a new stream or when recovering from errors induced by noise in the transmission channel. For this reason, an encoder usually selects the I-frame encoding method at intervals sufficient for decoder initialization or resynchronization.

P-frames benefit from motion compensation using motion predictors referenced to preceding frames. Both I- and P-frames can serve as reference frames when motion compensation is used for the prediction of other frames. As a result, any error that is introduced into an I- or P-frame could become magnified each time the affected region of the reference frame is accessed. The closed-loop transrating process of subsystem 64 prevents this accumulation of errors, and for this reason it is advantageous to select the closed loop transrating subsystem 64 for transrating of both I- and P-frames.

Typically, B-frames are used most frequently since they benefit from multiple motion compensated predictors referenced to I- or P-frames, either in the forward or backward directions. Since these frames typically are not used to predict other pictures, drift correction becomes less important and the reduced compression efficiency due to correction could even out-weigh any advantage resulting from the reduced drift within a single image. Therefore, it is advantageous to route the B frames through one or more open loop transrating subsystems 66 or 68. Note that in the case of H.264, it makes more sense to identify the pictures which are not used as reference frames for other pictures, and to assign only these pictures to the open loop transrating subsystems 66 or 68.

Many encoders are configured to use the B-frame encoding method for 2 out of every 3 frames or pictures and this is the reason for matching 2 dedicated open-loop transraters 66 and 68 with a single closed-loop transrater 64 in the example embodiment of FIG. 4. However, open-loop and closed-loop subsystems could be provided in any combination. Note that B-frames are easily forwarded to the closed loop transrater 64 in cases where the open-loop systems 66 and 68 become oversubscribed. Similarly, it is possible to forward I- or P-frames to one of the open-loop transraters 66 or 68 if the closed-loop transrater 64 becomes oversubscribed. However, the benefits of drift compensation will not be realized during such periods.

Advantageously, the embodiments of the hybrid transrating system of the present invention discussed above can be easily modified to support insertion of overlay content into a video signal, as discussed in a commonly-owned co-pending U.S. patent application entitled Methods, Apparatus, and Systems for Insertion of Overlay Content Into a Video Signal With Transrating Capabilities, filed simultaneously herewith.

It should now be appreciated that the present invention provides advantageous methods, apparatus, and systems for modifying the data rate of a video stream.

Although the invention has been described in connection with various illustrated embodiments, numerous modifications and adaptations may be made thereto without departing from the spirit and scope of the invention as set forth in the claims.

What is claimed is:

1. A method for modifying a data rate of a video signal, comprising:
   receiving a compressed video signal;
   providing a closed-loop transrating path for modifying a data rate of the video signal;
   providing an open-loop transrating path for modifying the data rate of the video signal;
   automated selecting of one of said open-loop transrating path or said closed-loop transrating path for modifying the data rate of at least a portion of said video signal;
   said closed-loop transrating path and said open loop transrating path are operable simultaneously and are adapted to accept at least different portions of said video signal; and
   providing pixel quantization error control in said closed loop transrating path, said pixel quantization error control comprising:
      obtaining errors from quantization of transformation coefficients of incoming pixels of the video signal;
      deriving pixel errors from said quantization errors;
      storing said pixel errors;
      retrieving said stored pixel errors during modification of said data rate of associated pixels;
      deriving error correction quantization data from said retrieved pixel errors; and
      applying said error correction quantization data in order to prevent accumulation of requantization artifacts during said modification of said data rate of said associated pixels;
   wherein:
      said closed-loop transrating path is selected for modifying the data rate of I-frames and P-frames of said video signal;
      said open-loop transrating path is selected for modifying the data rate of B-frames of said video signal;
      in the event that at least one of: (a) the open-loop transrating path is idle; and (b) the closed-loop path is oversubscribed, the open-loop transrating path is selected for modifying the data rate of I-frames and P-frames of the video signal without said pixel quantization error control; and in the event that at least one of: (a) the closed-loop transrating path is idle; and (b) the open-loop path is oversubscribed, selecting the closed-loop transrating path for modifying the data rate of B-frames.

2. A method in accordance with claim 1, wherein said closed-loop transrating path and said open loop transrating path are operable simultaneously and are adapted to accept frames from multiple video signals.

3. A method in accordance with claim 1, further comprising:
an additional open-loop transrating path for modifying the data rate of the video signal.

4. A method in accordance with claim 3, wherein said two open-loop transrating paths and said closed-loop transrating path are operable simultaneously.

5. A method in accordance with claim 1, wherein said open-loop transrating path comprises:
variable length decoding of said video signal to provide quantized transform coefficients;
performing an inverse quantization operation on said transform coefficients to scale said transform coefficients;
performing a quantization operation on said scaled transform coefficients to re-scale said transform coefficients to achieve a desired data rate; and
variable length encoding of said re-scaled transform coefficients to provide a video signal at said desired data rate.

6. A method in accordance with claim 1, wherein said closed-loop transrating path comprises:
variable length decoding of said video signal to provide quantized transform coefficients;
performing an inverse quantization operation on said transform coefficients to scale said transform coefficients;
performing a quantization operation on said scaled transform coefficients to re-scale said transform coefficients to achieve a desired data rate;
variable length encoding of said re-scaled transform coefficients to provide a video signal at said desired data rate;
obtaining errors from the quantization operation in the form of error transform coefficients;
performing an inverse transformation process on said error transform coefficients to provide pixel errors in the pixel domain;
storing said pixel errors;
retrieving said stored pixel errors when performing a motion compensation operation on associated pixels;
performing a transformation process on said motion compensated pixel errors to provide error correction transform coefficients; and
adding said error correction transform coefficients to said scaled transform coefficients obtained from said inverse quantization of said associated pixels in order to prevent accumulation of requantization artifacts during said quantization operation on said scaled transform coefficients.

7. A method in accordance with claim 1, further comprising:
providing a plurality of open-loop and closed loop transrating paths for modifying the data rate of the video signal.

8. A method in accordance with claim 7, wherein said plurality of open-loop and closed-loop transrating paths are operable simultaneously.

9. Apparatus for modifying a data rate of a video signal, comprising:
means for receiving a compressed video signal;
a closed-loop transrating path for modifying a data rate of the video signal;
an open-loop transrating path for modifying the data rate of the video signal;
means for selecting one of said open-loop transrating path or said closed loop transrating path for modifying the data rate of at least a portion of said video signal;
said closed-loop transrating path and said open loop transrating path are operable simultaneously and are adapted to accept at least different portions of said video signal; and
means for providing pixel quantization error control in said closed loop transrating path, said means for providing said pixel quantization error control comprising:
means for obtaining errors from quantization of transformation coefficients of incoming pixels of the video signal;
means for deriving pixel errors from said quantization errors;
storage means for storing said pixel errors;
means for retrieving said stored pixel errors during modification of said data rate of associated pixels;
means for deriving error correction quantization data from said retrieved pixel errors; and
means for applying said error correction quantization data in order to prevent accumulation of requantization artifacts during said modification of said data rate of said associated pixels;
wherein:
said closed-loop transrating path is selected for modifying the data rate of I-frames and P-frames of said video signal;
said open-loop transrating path is selected for modifying the data rate of B-frames of said video signal;
in the event that at least one of: (a) the open-loop transrating path is idle; and (b) the closed-loop path is oversubscribed, the open-loop transrating path is selected for modifying the data rate of I-frames and P-frames of the video signal without said pixel quantization error control; and
in the event that at least one of: (a) the closed-loop transrating path is idle; and (b) the open-loop path is oversubscribed, selecting the closed-loop transrating path for modifying the data rate of B-frames.

10. Apparatus in accordance with claim 9, wherein said closed-loop transrating path and said open loop transrating path are operable simultaneously and are adapted to accept frames from multiple video signals.

11. Apparatus in accordance with claim 9, further comprising:
an additional open-loop transrating path for modifying the data rate of the video signal.

12. Apparatus in accordance with claim 11, wherein said two open-loop transrating paths and said closed-loop transrating path are operable simultaneously.

13. Apparatus in accordance with claim 9, wherein said open-loop transrating path comprises:
a variable length decoder for variable length decoding of said video signal to provide quantized transform coefficients;
an inverse quantization module for performing an inverse quantization operation on said transform coefficients to scale said transform coefficients;
a quantizer module for performing a quantization operation on said scaled transform coefficients to re-scale said transform coefficients to achieve a desired data rate; and
a variable length encoder for variable length encoding of said re-scaled transform coefficients to provide a video signal at said desired data rate.

14. Apparatus in accordance with claim 9, wherein said closed-loop transrating path comprises:
- a variable length decoder for variable length decoding of said video signal to provide quantized transform coefficients;
- an inverse quantization module for performing an inverse quantization operation on said transform coefficients to scale said transform coefficients;
- a quantization module for performing a quantization operation on said scaled transform coefficients to re-scale said transform coefficients to achieve a desired data rate;
- a variable length encoder for variable length encoding of said re-scaled transform coefficients to provide a video signal at said desired data rate;
- means for obtaining errors from the quantization operation in the form of error transform coefficients;
- an inverse transform module for performing an inverse transformation process on said error transform coefficients to provide pixel errors in the pixel domain;
- storage means for storing said pixel errors;
- means for retrieving said stored pixel errors when performing a motion compensation operation on associated pixels;
- a transform module for performing a transformation process on said motion compensated pixel errors to provide error correction transform coefficients; and
- adder means for adding said error correction transform coefficients to said scaled transform coefficients obtained from said inverse quantization of said associated pixels in order to prevent accumulation of requantization artifacts during said quantization operation on said scaled transform coefficients.

15. Apparatus in accordance with claim 9, further comprising:
- a plurality of open-loop and closed loop transrating paths for modifying the data rate of the video signal.

16. Apparatus in accordance with claim 15, wherein said plurality of open-loop and closed-loop transrating paths are operable simultaneously.

* * * * *